US006250215B1

(12) United States Patent
Brenn

(10) Patent No.: US 6,250,215 B1
(45) Date of Patent: Jun. 26, 2001

(54) SINGLE AND DOUBLE SIDED INGREDIENT HOLDING SYSTEM

(76) Inventor: Eric Walter Brenn, 40 Raven La., Aliso Viejo, CA (US) 92656

( * ) Notice: Subject to any disclaimer, the term of this patent is extended or adjusted under 35 U.S.C. 154(b) by 0 days.

(21) Appl. No.: 09/764,977

(22) Filed: Jan. 16, 2001

Related U.S. Application Data

(60) Provisional application No. 60/175,836, filed on Jan. 13, 2000.

(51) Int. Cl.[7] ................................ A23L 1/00; A47J 27/00; A47J 27/04; A47J 37/00; F27D 7/02
(52) U.S. Cl. .................................. 99/468; 99/330; 99/331; 99/448; 99/476; 99/483; 99/516; 126/20; 126/369; 219/401
(58) Field of Search .......................... 99/325–333, 443 C, 99/443 R, 448, 467, 468, 473–476, 470, 477–479, 483, 485, 486; 126/20, 20.1, 369; 219/401, 400, 399, 409, 411, 388, 682, 686; 426/231–233, 237, 418, 467, 509–511, 523

(56) References Cited

U.S. PATENT DOCUMENTS 3,926,106 * 12/1975 Deusing et al. ................ 126/20 X
3,952,609 * 4/1976 Klemm ............................. 99/474
3,962,962 * 6/1976 Anderson ...................... 99/483 X
3,999,475 * 12/1976 Roderick ........................... 99/474
4,010,349 * 3/1977 Lee .................................. 219/401
4,011,805 * 3/1977 Vegh et al. ........................ 99/467
4,052,589 * 10/1977 Wyatt ............................... 219/400
4,062,983 * 12/1977 Roderick ......................... 426/418
4,074,108 * 2/1978 King ................................ 219/214
4,244,979 * 1/1981 Roderick .................... 426/523 X
4,343,985 * 8/1982 Wilson et al. ................... 219/214
4,373,430 * 2/1983 Allen ................................. 99/468
5,532,456 * 7/1996 Smith et al. ................. 99/474 X

* cited by examiner

Primary Examiner—Timothy F. Simone
(74) Attorney, Agent, or Firm—Curtis L. Harrington

(57) ABSTRACT

An ingredient housing system with entry window includes operating elements for providing an evenly heated humid air supply to food products, especially food ingredients, and utilizes any combination of air curtain fans, dry heating elements, water temperature probes, air temperature probes, air humidity probes, and a control computer. A source of vaporizing or hot moisture may include a water tank, inlet water lines, water inlet valves, wet heating elements, water level sensors, lower drain valves and the control computer. A connector and vane enables control of moist vapor within the ingredient housings, and distributed control of the vapor source and one or more housings and other component users of hot vapor may be had.

20 Claims, 2 Drawing Sheets

SINGLE AND DOUBLE SIDED INGREDIENT HOLDING SYSTEM

This application is based upon a co-pending provisional patent application No. 60/175,836 filed on Jan. 13, 2000.

FIELD OF THE INVENTION

This invention relates generally to equipment, thermal equipment and more particularly to high efficiency equipment for controlling heat and humidity as well as to take advantage of the heat capacity, density and flow of humid air. The structural embodiment of the invention is an improved single and double sided hot ingredient holding system which utilizes the natural energy and mass flow of a steam or hot vapor source.

BACKGROUND OF THE INVENTION

Thermal equipment, particularly thermal equipment in use in the food industry, will ideally require as precise a thermal and humidity control as possible. One problem involves the control and duplication of several pieces of equipment which may work against each other. Where each piece of equipment is separately contained and operated, the potential problems multiply, including more replacement parts, more electrical connections, more control electronics and the like. The more unified a series of equipments become, the more efficient is the overall operation.

Balancing energy in terms of utilization should also be considered. For example where one piece of equipment has a required ease of transport of food, most such equipment must have high user access, typically a rack of trays for quick removal for use in loading, bringing to temperature and maintaining temperature. Tray loading and storage usually requires a wide opening such as a door which provides a continual stream of upset to the internal environment and to the overall energy environment. A unit of equipment needs to have the ability to adjust from a condition of intermittent and continual usage. The food items recently added should come to a good temperature and humidity condition quickly, and the overall burden on the energy system should be eased.

Complicating this goal is the physics associated with the inside of the unit of equipment. Where hot air sources and heating elements are present, there is a danger that the dry heat will harden the food, and that the moist heat will condense on the food to make the food soggy. These are the extreme limits of wrong operation. More common are the closer limits of wrong operation in that food on horizontal racks for example, in the upper reaches overheats and dries out, whereas food on the lower reaches experiences condensation and is too cool.

Another problem is the delay time in bringing the food to temperature and humidity. Where electric heating of a separate water tank is used to provide steam or vapor, the electric elements have to be turned on well in advance of the actual need for the vapor, so that the electric elements can heat, followed by heating of the surrounding water, followed by a rise in temperature as to permit vapor and steam to be used.

The ability to use a large mass of water held at the optimum temperature is limited for many reasons, not the least of which is equipment spacing requirements, equipment designs militating against the proper proximity and orientation, and fact that current designs provide for limits based upon the surface area of containers, and typically provide a volume, mass and control scheme to serve specialized containers.

Physical and scientific limitations on multiple pieces of equipment are not only difficult to maintain, but monitoring in order that control may be effected is also problematic. In terms of moisture and humidity, temperature probes without more don't indicate moisture. One hundred eighty degrees of moist heat can cause heat and moisture penetration into food to bring the food to its final heated and moist condition more quickly. The same temperature of dry heat could cause hardening and spoilage of the food in a fraction of the time.

Distribution of heat is another problem. Where a pan is heated, no benefit is had unless it is certain that water is present, and unless it is certain that the humidity reaches the other areas of the cabinet. Where a dry heating element is energized, the amount of heat leaving the element before shut off depends upon the moisture, and therefore total heat capacity of the volume of air in the unit of equipment. Thus, temperature alone will not give an indication of how much thermal energy has been introduced. Humidity alone will not give an indication of how much thermal energy has been introduced, and neither will it enable a projection based upon usage of the equipment for quick additional moisture and thermal input.

Another problem with conventional equipment configuration is the vented cabinet. Where a vent is provided, the cabinet continuously emits a mixture of moisture and air to the surrounding room representing losses in energy due to the raised temperature of the exiting components compared to ambient temperature, and the energy which must be added to vaporize water to replace the humidity lost from the vent. Vented systems also have a physical limitation as to where they can be placed to insure that the vented exit does not cause condensation on other equipment or walls, and that the condensation exit is not blocked as it would upset the steady state temperature and moisture movements within the unit, and likely cause the food to become water laden or soggy.

SUMMARY OF THE INVENTION

The thermal environment equipment and process of the present invention is illustrated through structures and processes described with respect to a single and double sided hot ingredient holding system which utilizes a steam control flap mounted within a steam vent as a source of moist heat and moisture, and also utilizes a dry heating element combined with internal air circulation for evenness of distribution within the enclosure.

The components for full illustration, may include hot well, tank or well, wet heating elements within the tank, tank temperature probe, water inlet valve, water drain valve, water level sensors, water mass within the tank, an optimum water level range, various openings for food pans or ingredient pans, utility openings, one or more ingredient housings, dry heating elements within the ingredient housings or other dry heat source, upper temperature and/or humidity probes, middle temperature and/or humidity probes, lower temperature and/or humidity probes, air curtain and/or fans both to isolate the warm moist air inside from the dry cooler air outside, and to provide internal circulation to the internal environment more even, doorless entry window, customizable shelving and racks, entry windows—with and without doors for long term inactivity, steam vent, steam control flap, connection tube, and in the double housing a customizable wall to control the distribution of heat and moisture within the cabinet.

The ingredient housing box for the ventless system is preferably made of a rigid material such as metal or plastic and should be capable of safely holding hot water and steam with minimum ambient thermal loss through the ingredient housing walls. The ventless steam ingredient housing shape most commonly is box shape; however, for design efficiency or visual savvy can be any shape or size as long as it can hold its humidity and perform the function of producing steamy humid environment for the products contained within. Ventless indicates that there is no deliberate vent for vapor and hot air, and that any escape of heated vapor air mixture is with the removal of food, or through leakage from the doorless opening, mitigated by the air door or air guarding flow at the service opening.

In the large water holding tank, an inlet valve allows for the water to flow into the tank can be manually or electronically controlled both with regard to the ingredient housing's needs as well as well as other uses which draw from the main tank. The use of a main tank not only enables capacitance in terms of heat and vapor output content, but enables users of the heat and vapor to communicate such use to a central controlling computer so that such utilization losses can be compensated for in terms of both heat and water input long before depletion occurs to the extent that operability of the systems using the heat and vapor will be impacted.

[[[
Other operable components include level sensor(s) that establish when the correct water level, the optimum amount of water in the unit, has been reached. The level sensor is also a device that detects where the water is in the system. If the water level is too low or too high, it will detect it, take an action, and could also generate error signals for other problems with the water level. The level sensor can range from a simple float to a remote sonic, infrared, heat, electric, electronic, or other means of establishing the water level. The water is heated with the wet heating element(s) or wet heat source which can be water immersible electric heating elements, gas heat, microwave, electronic, light, or other kind of heat generating method or source. The water temperature probe detects the temperature of the water. The water temperature probe can be a simple thermistor to an infrared, electronic, or other means for attaining water temperature. The drain valve allows for the water to flow out of the ingredient housing box and can be manually or electronically controlled. The steam from the water in the ingredient housing box provides a portion of the heat and most of the humidity.

The dry heating element(s) or dry heat source which can be air electric heating elements, gas heat, microwave, electronic, or other kind of heat generating method or source and is used to dry out air and generate heat or dry hot air for the ingredient housing. The dry heating element(s) or dry heat source is most often placed at the top of the ingredient housing; however, this does not have to be the case and other methods of injecting dry heated air into the ingredient housing box could be used.

The upper temperature probe(s) or upper humidity probe (s), middle temperature probe(s) or middle humidity probe (s), and lower temperature probe(s) or lower humidity probe(s) detects the amount of humidity, dry heat, and temperature generated and how well the dry air and wet steam are mixing. The upper temperature probe(s) or upper humidity probe(s), middle temperature probe(s) or middle humidity probe(s), and lower temperature probe(s) or lower humidity probe(s) can be a simple thermistor, humidity sensor to an infrared, electronic, or other means for attaining humidity and temperature. The upper temperature probe(s) or upper humidity probe(s), middle temperature probe(s) or middle humidity probe(s), and lower temperature probe(s) or lower humidity probe(s) represent three general zones for measurement, although less or more may be utilized, the three being: lower, middle, and upper.

For Example, with a tall ingredient housing of over five feet, it may be desirable to utilize more zones. However, it would be possible to use one of the probe locations creating one zone instead of three for creating less cost and simplicity with a decrement in accuracy. This is especially true for smaller units of equipment. The reverse would also be true in having more probes placed inside the ingredient housing adding to the cost and greatly increasing accuracy. Some units of equipment are equipped with doorless entry window (s) are/is the window through which you can grab the products inside through without having to open a door. By not having a door to open speed of service is greatly increased, and a lesser perturbation on the conditions within the equipment are created.

On a single sided ventless humidity ingredient housing, the ventless entry window is typically only on one side of the line. On a double sided ventless humidity ingredient housing there are typically two doorless entry windows, one for each side so that workers can withdraw food on both sides of a serving line pulling from the ingredient housing at the same time. An optional door may be used where access will not occur for some time, and to more efficiently enable the internals of the ingredient housing to churn with air flow and better accomplish moisture and thermal mixing.

In the double sided ventless humidity ingredient housing there may preferably be a customizable wall in the ingredient housing box to prevent airflow from occurring into one side by its doorless entry window and out the other by its doorless entry window should they both be operated at the same time. The custom wall can include small holed areas and doors to move products from one side of the ingredient housing to the other with ease. In the majority of the cases you need a customizable wall in the ingredient housing box to prevent airflow in one side and out the other. However, it would be possible that in some locations which do not have large air movement and pressure differentials to operate with removal of the wall completely.
]]]

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
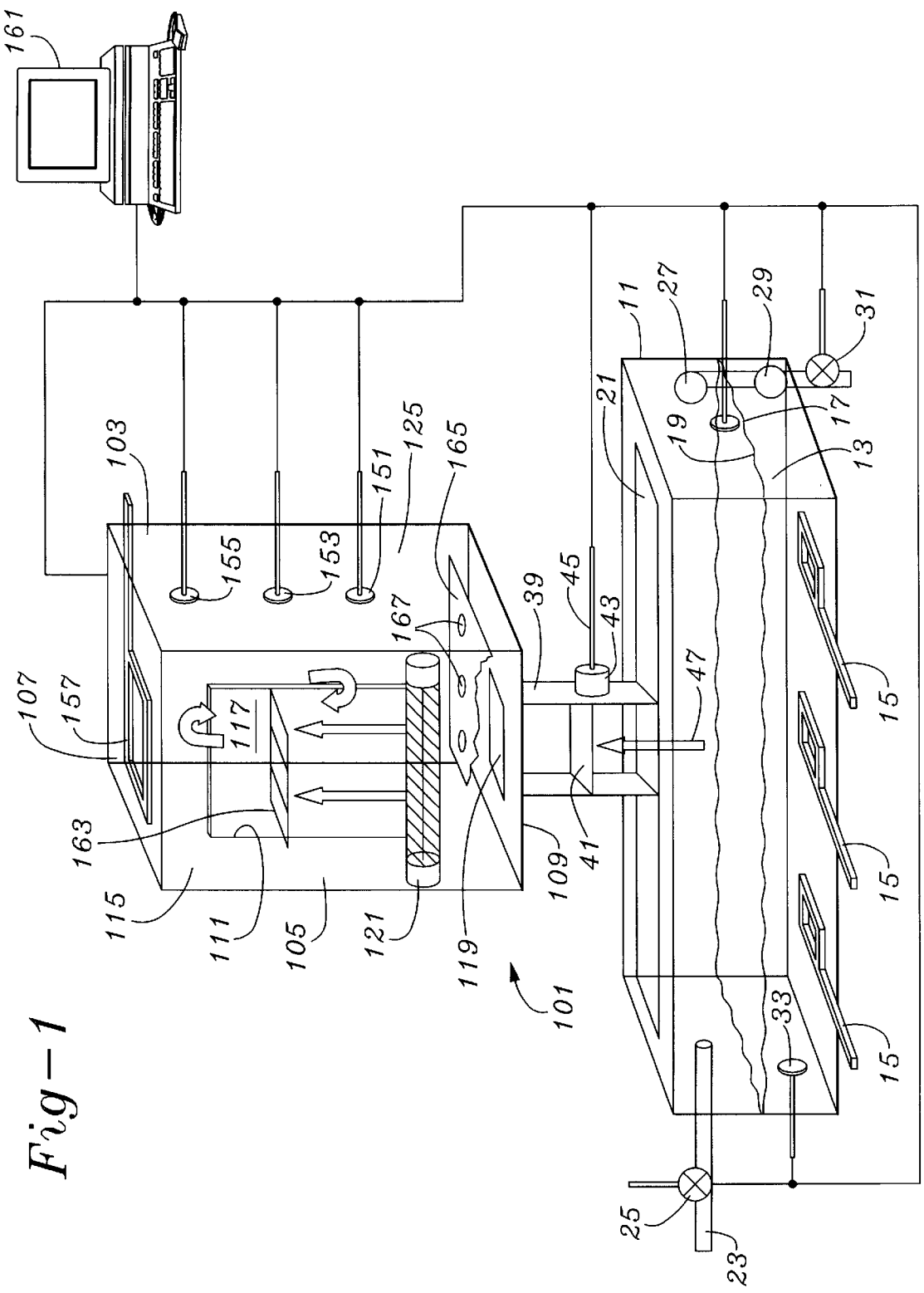
FIG. 1 is a three dimensional idealized layout for a system in which a single volume single sided ventless humidity ingredient housing utilizes a central wet heat source.

Referring to FIG. 1, a perspective view of a single sided ventless humidity ingredient system is shown. Beginning at the bottom, a tank 11 holds a volume of water 13, typically in fluid contact with a series of heating elements 15. Tank 15 is preferably made of a rigid material such as metal or plastic and should be capable of holding hot fluid and steam. The tank is usually shaped in a box type arrangement, however, for design efficiency or visual savvy can be any shape or size as long as it can hold water and perform the function of producing hot water and steam. The heating elements 15 may be electric heating elements or other including microwave, steam injection, to name a few. A tank level sensor 17 is seen just above the water's level 19, and is a device or devices that establish when the water's level 19, the optimum amount of water in the unit, has been reached. The level sensor 17 is also a device that detects where the water is in the tank 11. If the water level is too low or too high it will detect it and could also generate errors to problems with the water level. The level sensor 17 can range from a simple float to a remote sonic, infrared, heat, electric, electronic, or other means of establishing the water level in Tank 11. Tank 11 has an upper opening 21 which is a schematic representation of an area of available exit for water vapor. Such actual exits may be separately located pipes, vents, and other breaks in the containment of the gaseous containment of the tank 11. Opening 21 can be sealed off with ingredient pans (not shown) or other sealing devices that close off the top of the hot water HOT WELL sealing the steam inside the HOT WELL. The steam and the WATER from inside the HOT WELL provide a steady heat for food or production line ingredient that are placed in such pans in the top. The steam from the heated water 13 can feed a variety of applications. If food pans or ingredient pans are not to be used or designed into the system, the opening for food pans or ingredient pans could be sealed or not be made in the design, so that the unit simply provides steam to the steam vent and doorless humidity ingredient housing.

At the left of the tank 11, an inlet water supply 23 is controlled by a valve 25 to enable water to flow into the tank 11, and can be manually or electronically controlled. At the right of tank 11, an upper overflow drain 27 may be located near a bottom drain 29. The bottom drain 29 may be controlled by a valve 31. A temperature probe 33 is located to detect the temperature of the water 13, and may include other water quality detection sensors as well. Temperature probe 33 can be a simple thermistor to an infrared, electronic, or other means for attaining water temperature.

Located over, in the configuration of FIG. 1, and taking up part of the upper opening 21, is a connection tube 39 which is shown somewhat schematically and open in order that the inside may be more readily seen. Within the connection tube is a steam control flap or vane 41. The steam vent or connection tube is preferably made of a rigid material such a metal or plastic and can be round, square or other shape and it transports the steam from the tank 11 to any piece of equipment as needed. Vane 41 can be motorized, non-motorized, a fixed orifice, fixed shape, or manually changeable shape or orifice, or uses other device that is used to control the quantity of steam that is allowed through the connection tube 39. The steam vent controls the quantity and velocity of the steam to the ingredient housing either through a control apparatus device, its own fixed shape, or a modifiable shape.

The vane 41 may be advantageously controlled by a control motor 43 which may have a control line 45. The angle of the vane 41 will determine how much resistance rising steam or water vapor experiences as it flows past the vane 41. Appropriate sine and cosine relationships are utilized in the control of motor 43 in addition to the size of the connection tube 39, vane 41, and the pressure differential and mass flow represented by the upwardly directed arrow 47.

Above the connection tube 39 is an ingredient housing 101. The ingredient housing 101 has side walls 103 and 105, a top wall 107 and a bottom wall 109. A doorless entry opening or window 111 is located on a front wall 115 and is located opposite a solid back wall 117. The use of the term "doorless entry window" indicates an opening which in rapid use is not expected to have a door to be opened and closed each time food is to be placed within or withdrawn from the ingredient housing 101. This does not mean that the ingredient housing 101 may not have a door for closure. However, any door it has should be configured to be out of the way during high usage periods and the ingredient housing 101 should be designed to work properly during such high usage periods. Such a door becomes a "temporary closure" door during usage hours, and preferably will function as an isolation cover during long periods of non-use. The term window applies to the Figures only if a covering structure is present, and when a covering structure is absent, it is an opening.

An opening 119 is seen in the bottom wall 109, and connects with the connection tube 39 and is the portal through which heat and moisture enter from just over the water 13 surface. In cases where the ingredient housing 101 is located over the tank 11, an additional advantage may be had in that any condensed moisture may return directly through the connection tube 39. Where the ingredient housing 101 is not located over the tank 11, or is located so far away that return flow is a problem, drainage of condensate may have an independent tube connected with a waste drain. Waste drainage represents a loss of energy. Further remote operation may be aided by the use of an in-line motor or other method of creating the flow seen by arrow 47. But again, location over the tank 11 enables the ingredient housing 101 to operate with the same connection tube 39 as both a vapor riser combined with a condensate down comer. In some cases a small drain hole may be provided to insure that drainage may always occur, even where the vane 41 is completely closed.

Within the ingredient housing 101 is an air curtain and or other fan 121 which is shown as moving air along the inside of the rear of the doorless entry window 111. The doorless entry window 111 will preferagly have a sliding cover for the extended periods when the access opening is not needed to be accessed. When closed, the fan 121 acts simply as an internal circulation fan. In addition, the fan 121 can act as both a door fan and also output other circulation paths. In addition, multiple other fans of different type can be located within the the ingredient housing 101. This wall of air helps to prevent mass migration of moist air from flowing into or leaving the inside of the ingredient housing 101. It is understood that other devices for producing a flow of moisture laden air, such as electrostatic discharge and atomization, a central steam generator, etc. Where high pressure steam or vapor is used, the connection tube 39 may be replaced by a line and valve, and the return condensate operated with a separate line. The illustration of tank 11 with its heat source introduces but one method to create such humidity.

Supported in a position to have sensing contact with the air and humid air space within the ingredient housing 101, and of differing elevations at the side wall 103 is a lower probe set 151 which may be a temperature or humidity probe or both, a middle probe set 153 which may be a temperature or humidity probe or both, and an upper probe set 155 which may be a temperature or humidity probe or both.

A dry heating element 157 which is shown underneath the top wall 107 of and entering the ingredient housing 101 and forming a loop at the upper region of the ingredient housing 101 is shown. The dry heating element 157 can be located anywhere within the ingredient housing 101, but is shown located at the top to emphasize the driving force differences between the dry and wet heat. Other methods of injecting dry heated air into the case could be used.

All of the components which provide sensing or control may be tied into a computer 161, including inlet valve 25, wet heating elements 15, water temperature probe 33, level sensor 17, lower drain valve 31, lower probe set 151, middle probe set 153, upper probe set 155, dry heating element 157, air curtain fan 121 and motor 43. Programming of the computer 161 can be effected to measure the energy input into the system, the energy needed to be put into the system, as well as the energy and mass utilized by ingredient housing 101, as well as other components which may connected to receive heat and vapor from the upper opening 21, and measure the balance of wet and dry heat input, measure the humidity, measure the temperature, measure the fresh water input and either or both the input water temperature, water tank 11 temperature and ingredient housing 101 activation.

Control parameter output of the computer 161 can be speed and inlet selection of air for the air curtain fan 121, inlet flow and time for operation of inlet valve 25, energization time and input energy level for energization time and input energy level for dry heating elements 15, flushing rate and time for lower drain 29 by control of lower drain valve 31, both during normal operation and in response to filling by operation of inlet valve 25.

The air curtain fan 121 blows outside air across the doorless entry window 111 creating a wall of air and trapping the hotter, more humid air inside the ingredient housing 101. The air curtain fan 121 is usually used to circulate a portion of the air inside the ingredient housing 101 and removes the necessity for an independent circulation fan. The arrows of FIG. 1 show generally laminar air flow in a direction forming an air curtain. As the air within the ingredient housing 101 continues to circulate past the doorless entry window, and within the ingredient housing generally, it then continues mixing steam or hot water vapor with dry heat in a continually mixing pattern. The mixing pattern is generally consistent with the air flow pattern shown. In most instances the air curtain fan 121 is enough to provide all of the circulation needs; however, an independent fan inside the ingredient housing to circulate and mix the air can be employed, especially if the air curtain fan 121 is no sufficiently strong.

The air curtain fan 121 usually draws the air from the cold outside air so the operators when they insert their hand are buffered by the cold air wall and is an inexpensive method. In some operations it may be necessary to draw the air from a heated source. The air curtain fan 121 is usually mounted on the bottom of the ingredient housing, however, for design efficiency or visual savvy it may be mounted remotely blowing air in the needed direction to form an air curtain. The air curtain fan usually blows from bottom to top, however, for design efficiency or visual savvy it can blow the air top to bottom, right to left, left to right, or bottom to top.

One or more racks 161 may be provided to hold ingredients whose temperature and moisture is to be maintained. The air curtain fan 121 may be adjusted with due consideration to the location and any covering for the square opening 119. For example, where a slanted grid covers square opening 119, the circulation path within the ingredient housing 101 can be used to assist in drawing warm vapor up the connection tube 39. Other structures for introducing the vapor stream into the ingredient housing 101 can be used.

In some cases, especially where an opening 119 is located centrally or to one side, it may be preferable to control the distribution of the steam or wet vapor's initial distribution within the ingredient housing 101. An optional distribution plate 165 has a series of apertures 167 to selectively admit the steam or vapor. The size and distribution of the apertures 167 can be of any configuration and may vary depending upon which items are to be contained within ingredient housing 101. The sum total of the components seen in FIG. 1 can be referred to as a single sided hot ingredient holding system 191.

Figure 2:
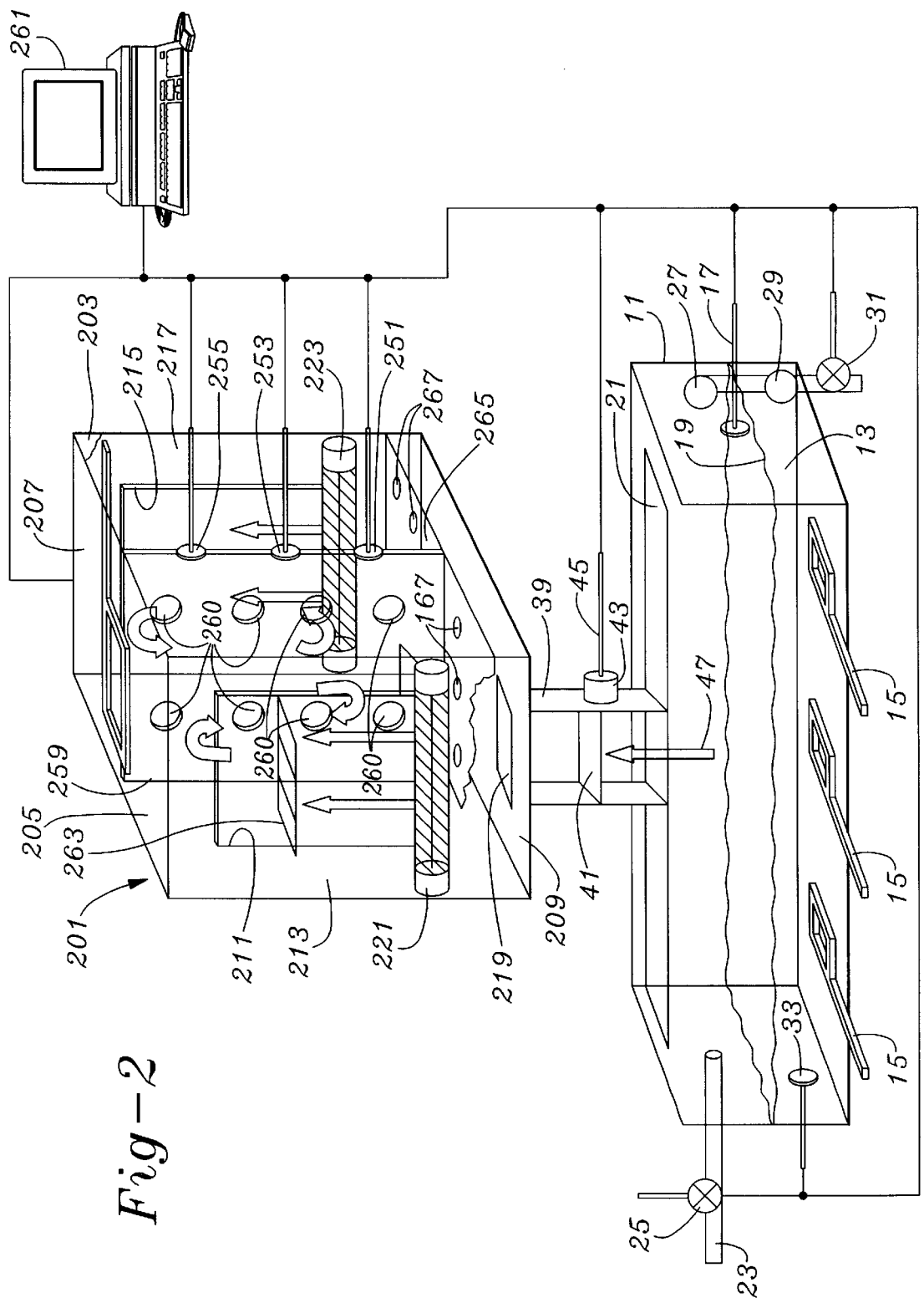
FIG. 2 is a three dimensional idealized layout for a system in which a double volume doubled sided ventless humidity ingredient housing also utilizes a central wet heat source.

Referring to FIG. 2, a three dimensional idealized layout for a double sided ventless humidity ingredient housing 201 is seen. In general, the main elements of the ingredient housing 201 are the same as the elements of the hot ingredient holding system 191, with some additions and strategic placement of elements seen in ingredient housing 101. Elements in common, and especially elements associated with tank 11 will not be repeated.

The ingredient housing 201 has side walls 203 and 205, a top wall 207 and a bottom wall 209. A front doorless entry window 211 is located on a front wall 213 and a rear doorless entry window 215 is located opposite and on a back wall 217.

An opening 219 is seen in the bottom wall 209, and connects with the connection tube 39 and is the portal through which heat and moisture enter from just over the water 13 surface. In cases where the ingredient housing 201 is located over the tank 11, an additional advantage may be had in that any condensed moisture may return directly through the connection tube 39. Other connection possibilities stated for housing 101 apply to housing 201.

Within the ingredient housing 201 is a front air curtain fan 221 which is shown as moving air along the inside of the rear of the doorless entry window 211 and a second rear air curtain fan 223 which is shown as moving air along the inside of the doorless entry window 215. These two walls of air help to prevent mass migration of moist air from flowing into or leaving the inside of the ingredient housing 201.

Supported in a position to have sensing contact with the air and humid air space within housing 201, and of differing elevations at the side wall 203 is a lower probe set 251 which may be a temperature or humidity probe or both, a middle probe set 253 which may be a temperature or humidity probe or both, and an upper probe set 255 which may be a temperature or humidity probe or both. A dry heating element 257 which is shown underneath the top wall 207 of and entering the ingredient housing 201 and forming a loop at the upper region of the ingredient housing 201 is shown. The probe sets 251, 253, and 255 are placed along a common optional divider wall 259 which can be used to completely segregate the flow patterns of the internal air flow. In this geometry, the probe sets 251, 253, and 255 can measure an average of the temperatures (if applicable), humidities, (if applicable) or both (if applicable) on either side of the wall 259. Where some bleeding over can occur, the probe sets 251, 253, and 255 are in essence measuring an average set of values. In some instances the wall 259 may be eliminated in its use entirely. In other instances, the wall 259 may be fitted with apertures 260 to enable selected communication between first and second portions formed by the subdividing presence of the wall 259.

All of the components which provide sensing or control may be tied into a computer 261, including inlet valve 25, wet heating element 15, water temperature probe 33, level sensor 17, lower drain valve 31, lower probe set 251, middle probe set 253, upper probe set 255, dry heating element 257, air curtain fans 221 and 223 and motor 43.

Programming of the computer 261 can be effected to measure the energy input into the system, measure the balance of wet and dry heat input, measure the humidity, measure the temperature, measure the fresh water input and either or both the input water temperature, water tank 11 temperature and doorless entry windows 211 and 215 activation.

Control parameter output of the computer 261 can be speed, differential speed, inlet selection and differential inlet selection of air for the air curtain fans 221 and 223, inlet flow and time for operation of inlet valve 229, energization time and input energy level for energization time and input energy level for dry heating elements 15, flushing rate and time for lower drain 29 by control of lower drain valve 31, and wet heating elements 15 both during normal operation and in response to filling by operation of inlet valve 25. Differential control of the air curtain fans 221 and 223, can, where probes are advantageously placed, control the flow of moist air to the side needing it most, particularly where wall 259 may be partially open with openings 260.

In some cases, especially where an opening 219 is located centrally or to one side, it may be preferable to control the distribution of the steam or wet vapor's initial distribution within the ingredient housing 201. An optional distribution plate 265 has a series of apertures 267 to selectively admit the steam or vapor. The size and distribution of the apertures 267 can be of any configuration and may vary depending upon which items are to be contained within ingredient housing 201. The components in FIG. 2 may be referred to collectively as a double sided hot ingredient holding system 291.

The inventions and structures of FIGS. 1 and 2 illustrate a structure and method for heating up water and air in order that products may be held at a settable humidity and temperature inside a ingredient housing without a door for easy access. The structure and method for heating up water and air in order that products may be held at a settable humidity and temperature inside a ingredient housing 101, 201 without a door for easy access is an assembly as has been shown to include a structure and method for containing the water system, a structure and method for holding water and steam, a structure and method for heating the water and making steam or water vapor, a structure and method for measuring temperature, a structure and method for adding water, a structure and method for removing water, a structure and method for sensing water, a structure and method for controlling water level, a structure and method for containing the ingredient housing system, a structure and method for distributing the steam to the correct location, a structure and method for drying and heating air, a structure and method for sensing humidity and/or temperature in the upper part of the unit, a structure and method for sensing humidity and/or temperature is the middle part of the unit, a structure and method for sensing humidity and/or temperature in the lower part of the unit, a structure and method for creating air flow across the entry area or areas creating an air door, a structure and method for creating air flow inside the ingredient housing for circulation and the mixing of dry heat with steam, and a customizable wall in the double sided unit to prevent air travel in one opening and out the other when there are pressure differentials between sides.

The structure and method for containing the water system should be made of a material that can hold the weight of water, steam, hot air, and devices for the life of the unit. It can vary in size and shape as long as it can perform the function of heating water and turning a portion of it into steam. The structure and method for holding water should allow for a water tight compartment that can hold hot water and steam for long periods of time or indefinitely. The structure and method for adding water is simply having the ability to add water to the holding/heating area when needed. The structure and method for removing water is simply having the ability to remove water from the holding/heating area when needed. The structure and method for sensing water is simply the ability for the unit to sense where the water is in the system. The structure and method for controlling water level is a device or method that can raise and lower the water level in the system. The structure and method for heating the water, elements 15, and making steam is a method of heating up the water, which can be done with electric element, gas, microwave, heat exchanger, or any other structure and method of heating available. The structure and method for measuring temperature is simply using a device to detect what the temperature of the water is so it can be regulated. A structure and method for containing a ingredient housing 191, 291 system is usually a box or oval-like container that can hold products or items inside and has one or more openings with which to remove the items stored inside while at the same time holding the unique atmosphere inside with respect to temperature and humidity. A structure and method for drying and heating up air can be done with electric elements, gas, microwave, heat exchanger, or any other structure and method of heating available.

A structure and method for sensing humidity and/or temperature, using selected ones of the probe sets 151, 153, 155, 251, 253, or 255, in the upper part of the unit or ingredient housing 101, 201 provides a way to measure or approximate/estimate through a remote sensor or run time data, especially computer 161, 261, what the humidity and/or temperature is in the upper part of the ingredient housing 101, 201. A structure and method for sensing humidity and/or temperature in the middle part of the unit or ingredient housing 101, 201 using the probe sets 151, 153, 155, 251, 253, or 255 is a way to measure or approximate/estimate through remote sensor or run time data what the humidity and/or temperature is in the middle part of the ingredient housing. A structure and method for sensing humidity and/or temperature in the lower part of unit, as in probe sets 151, 153, 155, 251, 253, or 255, is a way to measure or approximate/estimate through a remote sensor or run time data what the humidity and/or temperature is in the lower part of the ingredient housing. The upper, middle and lower probe sets 151, 153, 155, 251, 253, or 255 can be combined into one probe set to reduce cost and decrease accuracy and the reverse can also take place where the ingredient housing can be divided into numerous parts that increase accuracy and price. A structure and method for creating air flow across the entry area or areas creating an air door is a structure and method of blowing air across the front of the entry area in order to keep the inside environment inside the ingredient housing 101, 201, contained. A structure and method for creating air flow inside the ingredient housing 101, 202 for circulation and the mixing of dry heat with steam is simply creating a mixing air flow inside the ingredient housing to balance out the humidity and temperature throughout the ingredient housing. It can be done in some instances with just the air flow from the structure and method of blowing air across the front of the entry area, such as at entry window 111, 211; however, in other instances additional air moving technology would need to be employed for additional circulation. A customizable wall 259 in the double sided unit to prevent air travel in one opening and out the other when there are pressure differentials between sides is usually needed when there is the possibility of air flow in one opening and out the other. In conditions where air does not travel in one opening and out the other, the customizable wall in the double sided unit can be removed. The wall 259 can be solid or it can have holes in different areas to allow for certain types of air flow between the two areas.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A ventless ingredient holding system comprising:

an ingredient housing having an entry window;

an air curtain output adjacent said entry window for moving air generally parallel to said entry window;

a first entry way of vaporizing moisture input of said ingredient housing;

at least one sensor for measuring at least one of humidity and temperature within said and ingredient housing;

a first source of dry heat within said ingredient housing, said air curtain for moving air within said ingredient housing to expose said air to both said first entry way of vaporizing moisture and said first source of dry heat; and a controller for controlling at least one of said first source of dry heat and said air curtain output in response to said at least one sensor.

2. The ventless ingredient holding system as recited in claim 1 and further comprising a distribution plate at least partially covering said first entry way of vaporizing moisture input of said ingredient housing in order to direct said vaporizing moisture as it enters said ingredient housing.

3. The ventless ingredient holding system as recited in claim 1 and further comprising a plurality of said at least one sensors within said ingredient housing, located at least two heights within said ingredient housing.

4. The ventless ingredient holding system as recited in claim 1 and further comprising a connection tube having a first end in alignment with said a first entry way of vaporizing moisture input, and a second end.

5. The ventless ingredient holding system as recited in claim 4 wherein said connection tube includes an adjustable flow restriction for controlling the amount of vaporizing moisture input entering said ingredient housing.

6. The ventless ingredient holding system as recited in claim 4 and further comprising a first source of vaporizing moisture in fluid communication with said second end of said within said connection tube.

7. The ventless ingredient holding system as recited in claim 6 wherein said connection tube is at least one of sized, shaped or constructed to limit flow of said first source of vaporizing moisture through said connection tube to said ingredient housing with due consideration to at least one of a flow and a pressure characteristics of said first source of vaporizing moisture.

8. The ventless environmental system as recited in claim 6 and wherein said first source of vaporizing moisture further comprises:

a water containment structure; and a source of heat directed to heat water contained within said water containment structure.

9. The ventless ingredient holding system as recited in claim 8 and further comprising a source of fill into said water containment structure controlled by a fill valve and a source of drainage controlled by a drainage valve, both said fill valve and said drainage valve controllably connected to and controlled by said controller.

10. The ventless ingredient holding system as recited in claim 1 wherein said air curtain output is also for creating air flow inside said ingredient housing for circulation and mixing of vaporizing moisture and dry heat within said ingredient housing.

11. A ventless ingredient holding system comprising:

a ingredient housing having a first access opening and a second access opening;

a first air curtain output associated with said first access opening and a second air curtain output associated with said second access opening for moving air generally parallel to its associated said first and said second access openings;

a first entry way of vaporizing moisture input of said ingredient housing;

at least one sensor for measuring at least one of humidity and temperature within said and ingredient housing;

a first source of dry heat within said ingredient housing, said air curtain for moving air within said ingredient housing to more fully expose air within said ingredient housing to both said vaporizing moisture from said entry way of vaporizing moisture and said first source of dry heat; and a controller for controlling at least one of said first source of dry heat, and said air curtain output in response to said at least one sensor.

12. The ventless ingredient holding system as recited in claim 11 and further comprising a distribution plate at least partially covering said first entry way of vaporizing moisture input of said ingredient housing in order to direct said vaporizing moisture as it enters said ingredient housing.

13. The ventless ingredient holding system as recited in claim 11 and further comprising a plurality of said at least one sensors within said ingredient housing, located at least two heights within said ingredient housing.

14. The ventless ingredient holding system as recited in claim 11 and further comprising a connection tube having a first end in alignment with said a first entry way of vaporizing moisture input, and a second end.

15. The ventless ingredient holding system as recited in claim 14 and further comprising a first source of vaporizing moisture in fluid communication with said second end of said within said connection tube.

16. The ventless ingredient holding system as recited in claim 15 and wherein said first source of vaporizing moisture within said ingredient housing further comprises:

a water containment structure within said ingredient housing; and a source of heat directed to heat water contained within said water containment structure.

17. The ventless ingredient holding system as recited in claim 11 wherein said first and second access openings are openable and closeable entry windows located on opposite sides of said ingredient housing.

18. The ventless ingredient holding system as recited in claim 17 and further comprising a divider wall at least partially dividing said ingredient housing into a first portion associated with said first access opening and a second portions associated with said second access opening.

19. The ventless ingredient holding system as recited in claim 18 and further comprising a plurality of said at least one sensors within said ingredient housing, located along said divider wall within said ingredient housing and enabled to measure conditions in both said first and said second portions.

20. The ventless ingredient holding system as recited in claim 18 and wherein said divider wall includes a plurality of strategically placed apertures to enable selected communication between said first and said second portions.

* * * * *